United States Patent [19]
Nakayama

[11] Patent Number: 5,444,240
[45] Date of Patent: Aug. 22, 1995

[54] POSITION DETECTING APPARATUS EMPLOYING AN ESTIMATING FUNCTION

[75] Inventor: Akihito Nakayama, Tokyo, Japan

[73] Assignee: Sony Corporation, Tokyo, Japan

[21] Appl. No.: 90,930

[22] Filed: Jul. 14, 1993

[30] Foreign Application Priority Data

Jul. 14, 1992 [JP] Japan .................................. 4-208619

[51] Int. Cl.⁶ .............................................. G01D 5/34
[52] U.S. Cl. .............................. 250/237 G; 250/231.14; 356/375
[58] Field of Search ...................... 250/231.14, 231.16, 250/231.18, 237 G, 201.2; 341/13, 31; 356/373, 375

[56] References Cited

U.S. PATENT DOCUMENTS

| | | | |
|---|---|---|---|
| 4,187,456 | 2/1980 | von der Heide | 250/231.16 |
| 4,524,347 | 6/1985 | Rogers | 250/231.18 |
| 4,623,790 | 11/1986 | Stössel | 250/231.16 |
| 4,654,636 | 3/1987 | Rusk | 250/231.18 |
| 4,691,192 | 9/1987 | Baker | 250/231.16 |
| 4,780,703 | 10/1988 | Ishida et al. | 250/231.16 |
| 4,806,034 | 2/1989 | Plummer | 250/231.16 |
| 4,878,077 | 10/1989 | Maeno et al. | 354/400 |
| 4,994,991 | 2/1991 | Richman | 250/231.14 |
| 5,057,859 | 10/1991 | Ishimaru | 354/400 |
| 5,068,529 | 11/1991 | Ohno et al. | 250/237 G |

FOREIGN PATENT DOCUMENTS 0300823 7/1988 European Pat. Off. .
WO8402590 7/1984 WIPO .

OTHER PUBLICATIONS

European Search Report.
Design and Construction of a Microcomputer-Controlled Light-Weight Robot Arm, Lygouras, Robotics and Autonomous Systems; pp. 269–283, Nov. 1991.

*Primary Examiner*—Stephone B. Allen
*Attorney, Agent, or Firm*—Ronald P. Kananen

[57] ABSTRACT

A position detecting apparatus with a sampling function, comprises a waveform generator for generating repetitive periodic waveforms in relation to a moving object to be measured. A processor samples the output of the waveform generator and, after digitizing the same, processes the digital data to detect the position of the object. The processor first estimates the current position from the data obtained in the preceding detection and then determines the current position on the basis of the estimated position. The apparatus can be incorporated in a system for driving an optical unit in a video camera, wherein the object to be measured is a moving focus lens member and is actuated by a direct drive motor.

19 Claims, 9 Drawing Sheets

FIG. 7

| PHASE | RELATION AMONG WAVEFORM VALUES |
|---|---|
| 1 | $A\cos\theta \geq A\sin\theta > *A\sin\theta$ |
| 2 | $A\sin\theta > A\cos\theta \geq *A\cos\theta$ |
| 3 | $A\sin\theta \geq *A\cos\theta > A\cos\theta$ |
| 4 | $*A\cos\theta > A\sin\theta \geq *A\sin\theta$ |
| 5 | $*A\cos\theta \geq *A\sin\theta > A\sin\theta$ |
| 6 | $*A\sin\theta > *A\cos\theta \geq A\cos\theta$ |
| 7 | $*A\sin\theta \geq A\cos\theta > *A\cos\theta$ |
| 8 | $A\cos\theta > *A\sin\theta \geq A\sin\theta$ |

FIG. 8

| S(n-1) \ S(n) | 1 | 2 | 3 | 4 | 5 | 6 | 7 | 8 |
|---|---|---|---|---|---|---|---|---|
| 1 | 0 | 1 | 2 | 3 | INDEFINITE | -3 | -2 | -1 |
| 2 | -1 | 0 | 1 | 2 | 3 | INDEFINITE | -3 | -2 |
| 3 | -2 | -1 | 0 | 1 | 2 | 3 | INDEFINITE | -3 |
| 4 | -3 | -2 | -1 | 0 | 1 | 2 | 3 | INDEFINITE |
| 5 | INDEFINITE | -3 | -2 | -1 | 0 | 1 | 2 | 3 |
| 6 | 3 | INDEFINITE | -3 | -2 | -1 | 0 | 1 | 2 |
| 7 | 2 | 3 | INDEFINITE | -3 | -2 | -1 | 0 | 1 |
| 8 | 1 | 2 | 3 | INDEFINITE | -3 | -2 | -1 | 0 |

F I G. 11
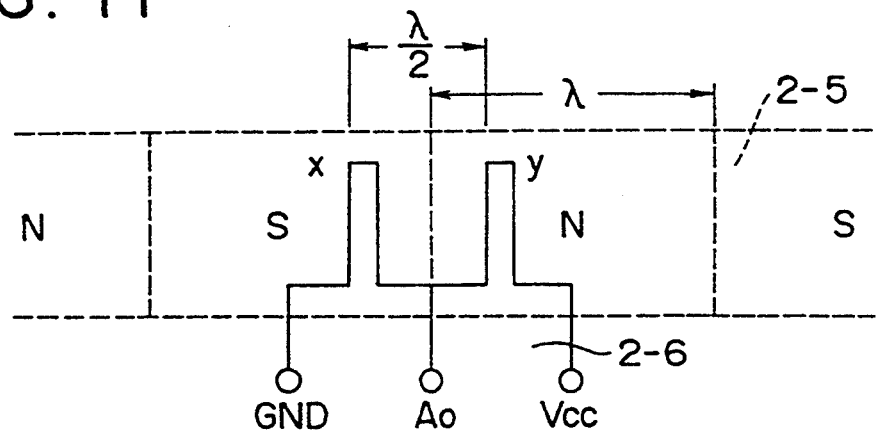
F I G. 12
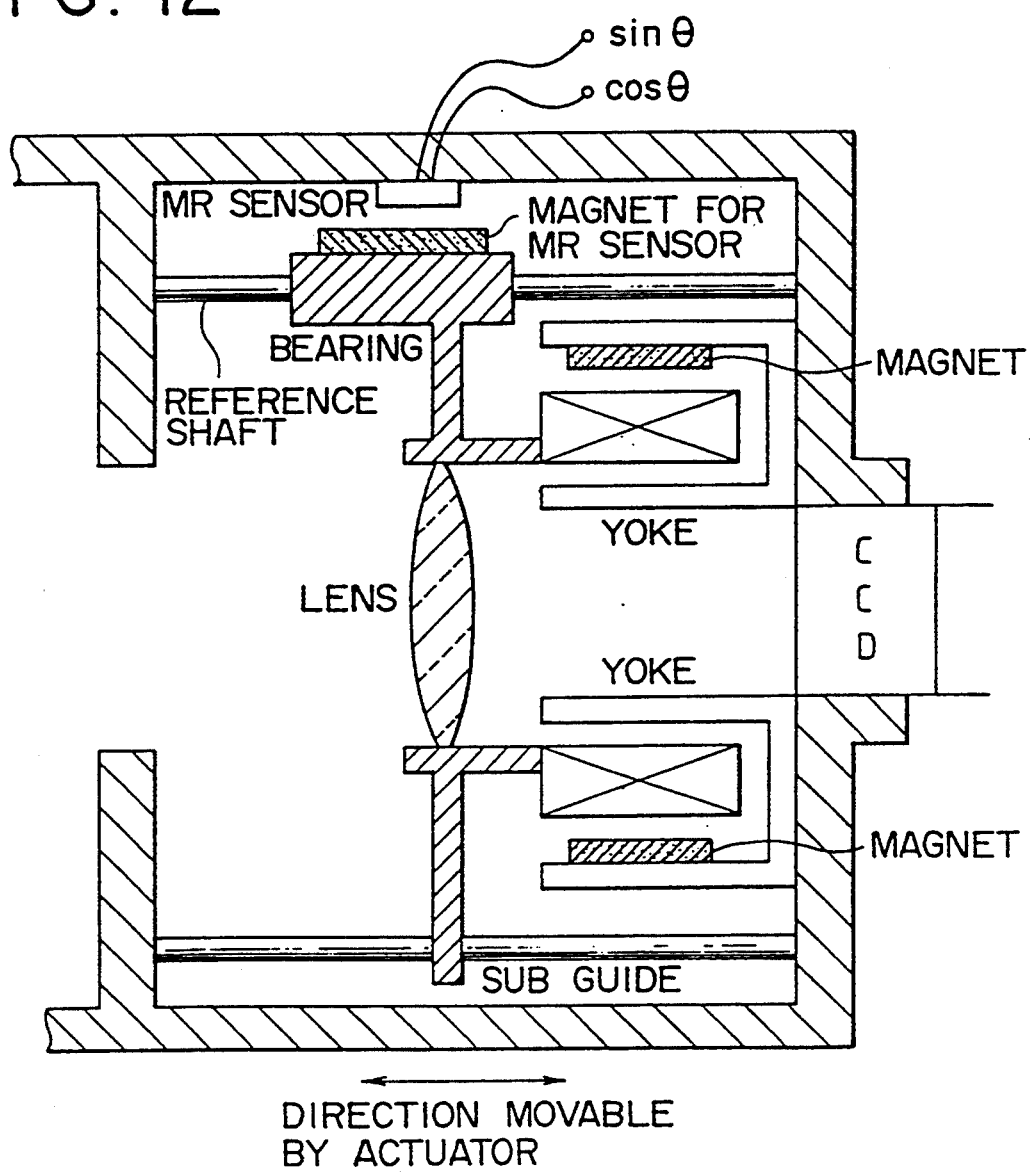
DIRECTION MOVABLE
BY ACTUATOR

POSITION DETECTING APPARATUS EMPLOYING AN ESTIMATING FUNCTION

BACKGROUND OF THE INVENTION

1. Field of the Invention

The present invention relates to a position detecting apparatus with a sampling function and, more particularly, to an apparatus for detecting the position of an object by first sampling repetitive periodic waveforms by a linear encoder and then processing the sampled data.

2. Description of the Related Art

In a driving system for an optical unit in a video camera or the like where an object needs to be positioned with a high precision, it is generally customary of late to employ a direct drive motor which actuates the object directly without using any speed reduction mechanism. In this case, a position detecting apparatus for positioning the object requires a high resolution since no speed reduction mechanism is incorporated. Therefore it is usual to adopt a method which, for achieving such a high resolution, generates a periodic waveform in accordance with the motion of the object by a linear encoder or the like and, after sampling the periodic waveform, processes the sampled data through digital calculation to thereby detect the desired position.

FIG. 1 shows a hardware structure of an exemplary position detecting apparatus employing a conventional linear encoder. A sensor incorporated in this position detecting apparatus has an optical linear encoder 2 and, when an object 1 to be measured is moved in a direction indicated by an arrow, the sensor generates, per fixed distance or period $\lambda$, sine and cosine waves having an amplitude A on both sides of a center V0.

FIG. 2 is an explanatory diagram schematically showing an exemplary constitution of such an optical linear encoder 2. Slits are arrayed at an interval equivalent to the period $\lambda$ in a movable slit member 2-2 which is displaced with the object 1. A laser beam emitted from a semiconductor laser 2-1 such as an LED; and through the movable slit member 2-2 and is received by two optical detectors 2-4 disposed opposite to two fixed slits 2-3 formed at an interval of $\lambda/4$, whereby the sine and cosine waves of the period $\lambda$ are detected by the two optical detectors 2-4.

The waves $A\sin\theta$ and $A\cos\theta$ outputted from the sensor are supplied respectively via sample hold circuits 3, 3 and an analog selector 4 to an A/D converter 5 where analog-to-digital conversion 5 is executed to produce digital data, which are then supplied to a CPU 6. The sampling timing and so forth are controlled by the CPU 6 on the basis of a signal obtained from an external timer circuit 7.

FIG. 3 graphically shows the output of the sensor, in which sine and cosine waves of the period corresponding to the distance $\lambda$, are outputted in accordance with the motion of the object to be measured.

FIG. 4 is a flowchart for explaining an algorithm to detect the position of the object by utilizing the outputs of the sensor.

In this algorithm, first the detection outputs $A\sin\theta$, $A\cos\theta$ and V0 are sampled by the sample hold circuits 3, 3 (step ①) and, after selection by the analog selector 4 and subsequent analog-to-digital conversion by the A/D converter 5, the digital data are inputted to the CPU 6 (step ②).

According to the following equations, $*A\sin\theta$ and $*A\cos\theta$ are calculated from the digital data $A\sin\theta$, $A\cos\theta$ and V0 thus inputted (step ③).

$$*A\sin\theta = V0 - (A\sin\theta - V0) = 2V0 - A\sin\theta \quad (1)$$

$$*A\cos\theta = V0 - (A\cos\theta - V0) = 2V0 - A\cos\theta \quad (2)$$

The data $*A\sin\theta$ and $*A\cos\theta$ represent the waveforms where $A\sin\theta$ and $A\cos\theta$ are inverted respectively with respect to V0 at the center. FIG. 5 graphically shows the relationship between such two waveforms.

Subsequently the waveform values of $A\sin\theta$, $A\cos\theta$, $*A\sin\theta$ and $*A\cos\theta$ are compared with one another, and a calculation is executed to find the current position in the 8-phase data composed of the four waveforms shown in FIG. 6. The relationship among the values of the four waveforms in the individual phases is listed in a table of FIG. 7, and the current phase S(n) is calculated by using the table. Thereafter the distance $\pm \Delta L$ (where $\pm$ denotes the directions) of the motion during the sampling action, i.e., the direction and the length in the current motion, are calculated from the values of the current phase S(n) and the preceding phase S(n−1) by using the relationship of variations shown in a table of FIG. 8 (step ④). It signifies that when $\lambda = 400$ $\mu$m for example, 1 phase is equivalent to 50 $\mu$m, and if the length of the motion corresponds to −2 phases, the object has moved by a length of 100 $\mu$m in the direction (−) during the sampling action.

The current position POS(n) can be calculated by adding to the preceding position POS(n−1) the motion length $\pm \Delta L$ thus obtained during the sampling action (step ⑤).

$$POS(n) = POS(n-1) \pm \Delta L \quad (3)$$

And finally, according to the following equation, both the position POS and the phase S are delayed for the time corresponding to one sampling action (step ⑥).

$$POS(n-1) = POS(n), \ S(n-1) = S(n)$$

The above is an algorithm for detection of the position, and the position of the object 1 can be detected by repeating the procedure in the flowchart.

According to the above-described conventional algorithm for detection of the position, when the object to be measured has moved by the distance of $\lambda/2$ during one sampling action, the direction of the motion is unknown as shown in the table of FIG. 8, and the variation or the distance of the motion during the sampling action is indefinite. Furthermore, in case the object has moved by any length greater than $\lambda/2$ during one sampling action, it follows that both the distance and the direction of the motion are prone to be mistaken.

In averting such errors, there exist some restrictions in the prior art relative to the performance including that the maximum motion distance of the object to be measured, i.e., the maximum velocity thereof during one sampling action, needs to be limited to a value smaller than $\lambda/2$ during one sampling action. Meanwhile, for alleviating such restriction, it becomes necessary to enhance the capability of the CPU for shortening the sampling period and also to provide an external hardware counter. Thus, due to such additional requirements, there arises another problem that the production cost is increased.

OBJECT AND SUMMARY OF THE INVENTION

It is an object of the present invention to provide an improved position detecting apparatus which ensures an enhanced performance capable of solving the problems mentioned above and eliminating any restriction relative to the velocity or acceleration in the motion of an object to be measured.

According to one aspect of the present invention, there is provided an improvement in a position detecting apparatus which comprises a device for generating repetitive periodic waveforms in relation to a moving object to be measured, and a processor for sampling the output waveforms of the device and, after digitizing the same, processing the digital data to detect the position of the object to be measured. In this apparatus, the processor first estimates the current position from the data obtained in the preceding detection and then determines the current position on the basis of such estimated position.

The processor includes a sampling function and an A/D converting function for digitizing the repetitive periodic waveforms to produce digital data. A position estimating function estimates the current position of the object every sampling action on the basis of the data obtained by the preceding detection. Then a variation deciding function calculates, on the basis of the estimated position data and the input digital data, the difference between the estimated position and the input actual position during the sampling action, and decides the result of such calculation as a variation relative to the motion of the object. And a position determining function determines the current position from the sum of the estimated position and the variation thus decided, and delivers the result as a position detection output. Specifically, the repetitive periodic waveform generator is composed of, e.g., a linear encoder which generates a plurality of repetitive periodic waveforms having the same period. The data inputted to the processor is so decided as to represent which of a plurality of phases that divide each period by combining the repetitive periodic waveforms. Subsequently the position estimating function estimates the phase corresponding to the current estimated position, and then the variation deciding function decides the variation on the basis of such estimated phase and the phase data obtained by the phase deciding function.

The position detecting apparatus of the present invention is applicable to a high-precision positioning mechanism where an object to be measured is actuated by a direct drive motor. It is also possible to use the present invention for positioning a focus lens in a system to drive an optical unit in a video camera equipped with a zoom lens mechanism.

Due to the constitution mentioned, the current position can be detected on the basis of the estimated position, and it is possible, for estimating the position, to add a first-degree difference (velocity information) of the position, a second-degree difference (acceleration information) or a higher-degree difference to consequently eliminate the restrictions relative to the motion distance or the velocity change of the object during one sampling action.

In other words, the maximum velocity of the object is not limited at all and, in principle, a normal operation can be performed for detecting the position regardless of any high velocity. In this case, although there exists a restriction on the velocity change or acceleration during a sampling action, such restriction on the acceleration can be eliminated by taking into consideration the acceleration (second-degree difference) at the time of estimating the position. And by adopting a further higher-degree difference in the estimation of the position, it is rendered possible to process the component thereof as well.

The algorithm for such detection of the position is extremely simple, and the burden on the CPU is not increased particularly in preparing required software for execution of the algorithm, hence achieving a great improvement in the performance. Consequently, in view of the enhanced position detecting capability, remarkable effects are attainable inclusive of a grade down of the required CPU and nonnecessity of hardware circuits.

The above and other features and advantages of the present invention will become apparent from the following description which will be given with reference to the illustrative accompanying drawings.

BRIEF DESCRIPTION OF THE DRAWINGS

FIG. 7 is a table showing the relationship of values among the phases of four repetitive periodic waveforms;

FIG. 8 is a table showing the relationship among the phase variations during a sampling action;

FIG. 11 is a schematic diagram for explaining the principle of operation of an MR sensor;

FIG. 12 is a sectional view schematically showing the structure of the embodiment where an MR sensor is employed as a position detecting apparatus in a system which drives an optical unit for a video camera equipped with a zoom lens mechanism.

DESCRIPTION OF THE PREFERRED EMBODIMENTS

Hereinafter the constitution of an exemplary position detecting apparatus embodying the present invention will be described with reference to the states of motion of an object to be measured.

Suppose now that the object is in uniform velocity motion. The position POS of the object in such uniform velocity motion is shown in Eq. (4) by a sampling system and the velocity VEL of the object can be expressed by the positional difference, as shown in Eq. (5).

$$POS(n) = POS(n-1) + VEL(n-1) \qquad (4)$$

$$VEL(n) = POS(n) - POS(n-1) \qquad (5)$$

where VEL(n) and VEL(n−1) denote the current velocity and the preceding velocity, respectively.

Namely, when the object to be measured is in uniform velocity motion, the current position can be represented by the sum of the preceding position and the velocity.

Figure 1:
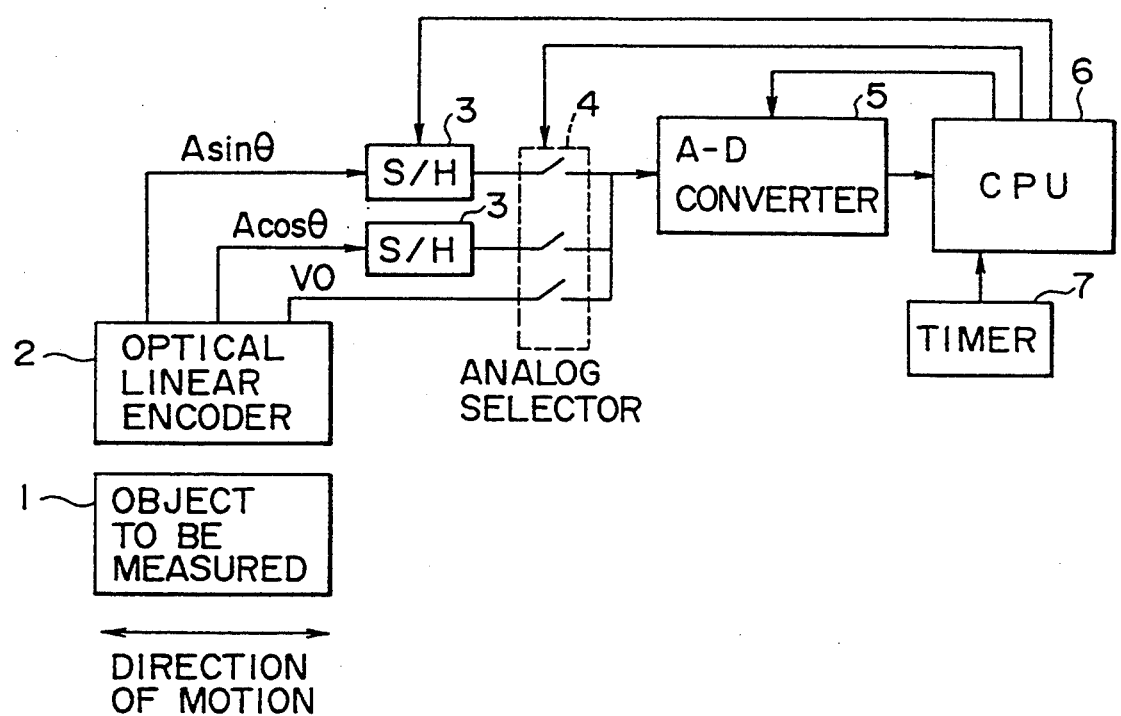
FIG. 1 is a schematic block diagram showing the hardware constitution of a conventional position detecting apparatus where a linear encoder is employed.
Figure 2:
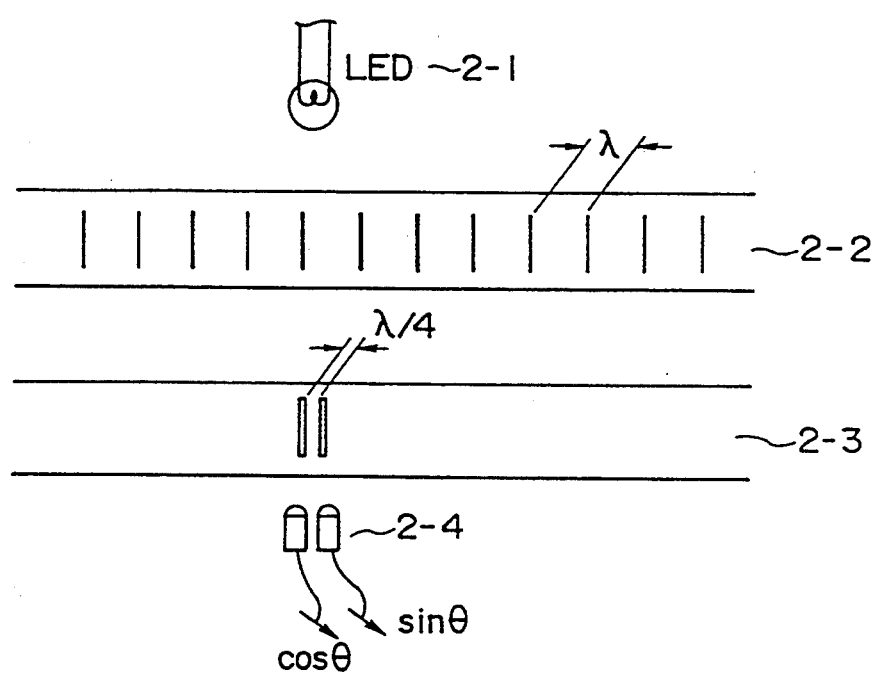
FIG. 2 shows the constitution of an exemplary optical linear encoder.
Figure 3:
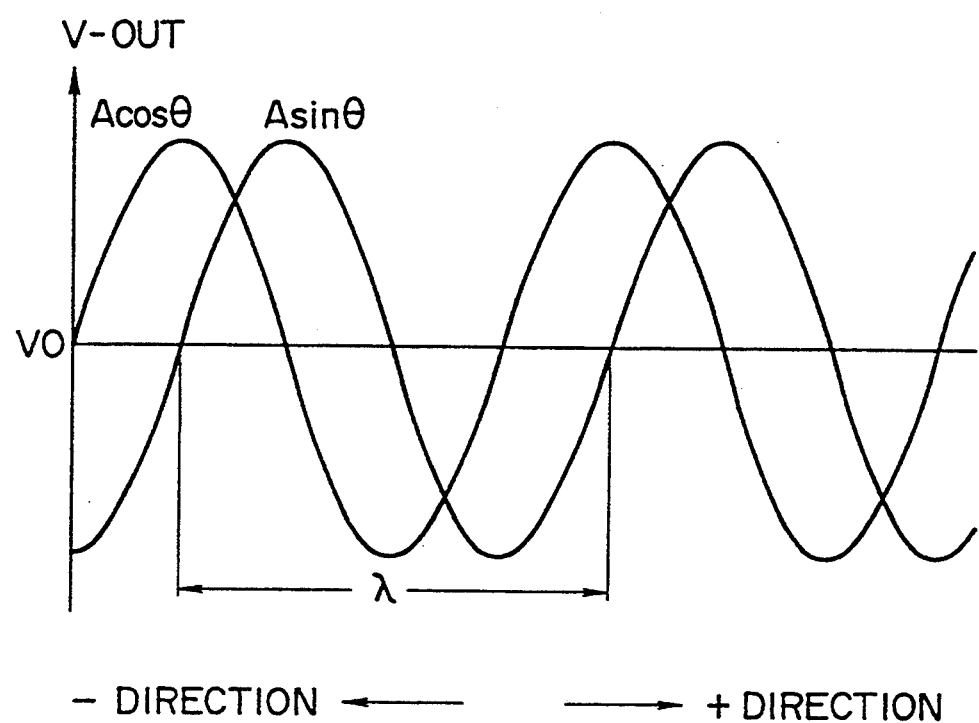
FIG. 3 is a waveform chart graphically showing a repetitive periodic waveform output of a sensor.
Figure 4:
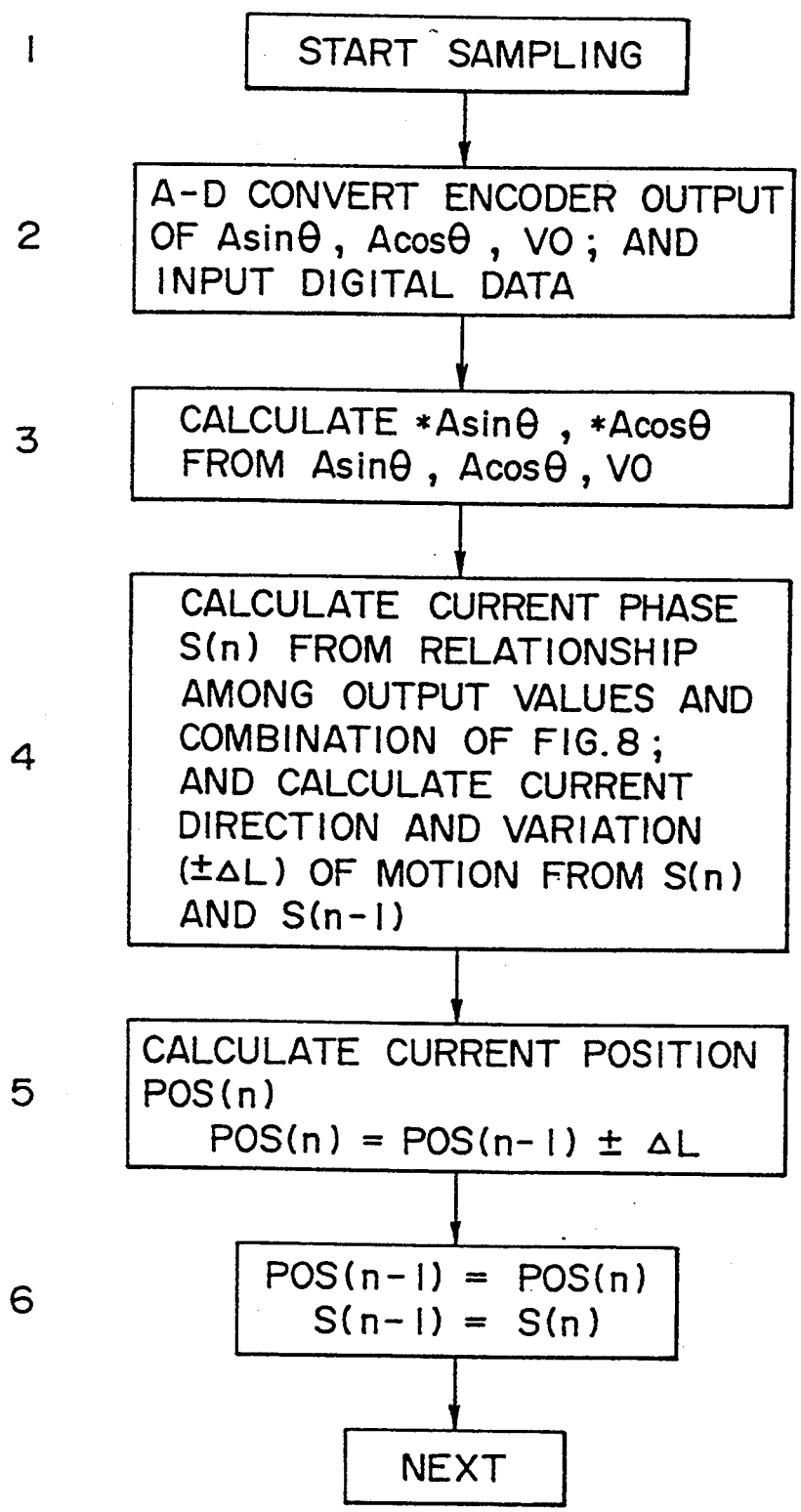
FIG. 4 is a flowchart for explaining a conventional position detecting algorithm.
Figure 5:
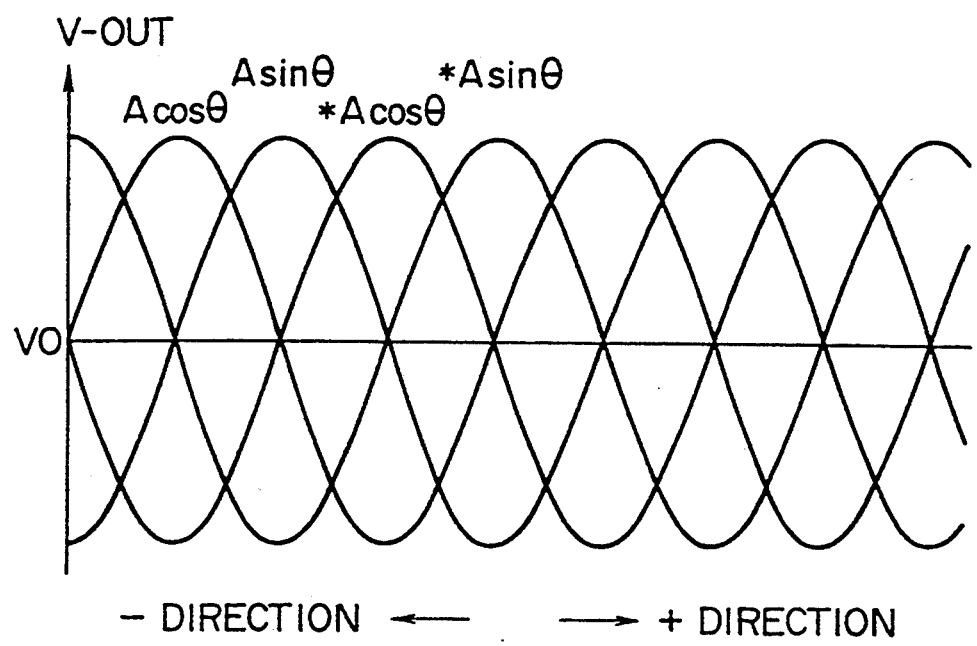
FIG. 5 is a waveform chart graphically showing the relationship among four repetitive periodic waveforms.
Figure 6:
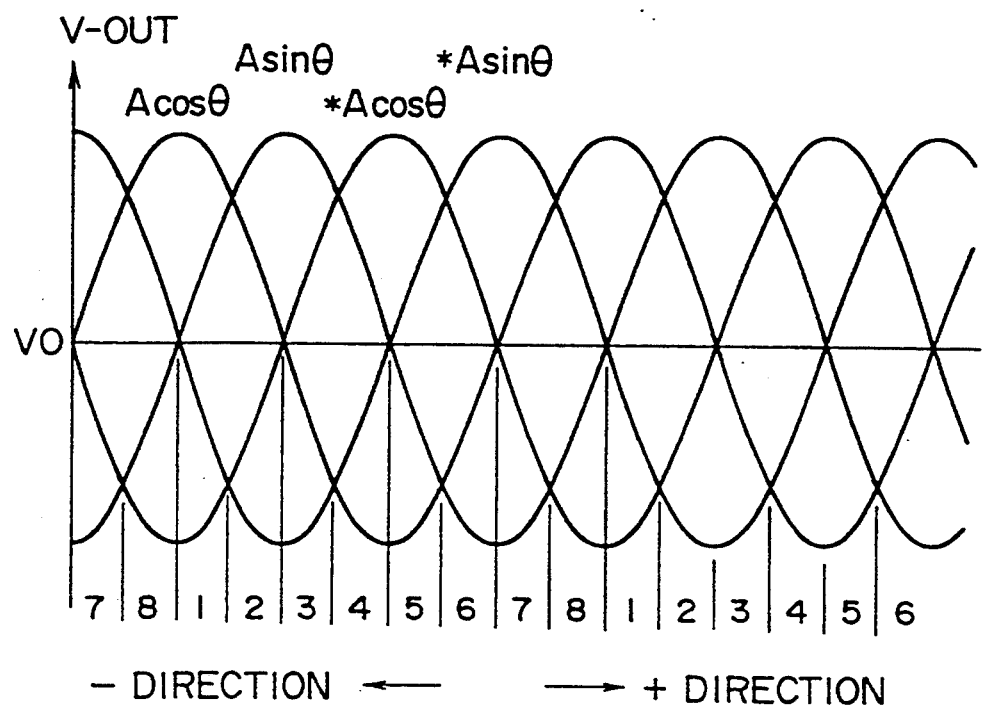
FIG. 6 is a waveform chart for explaining eight phases formed of four repetitive periodic waveforms.
Figure 9:
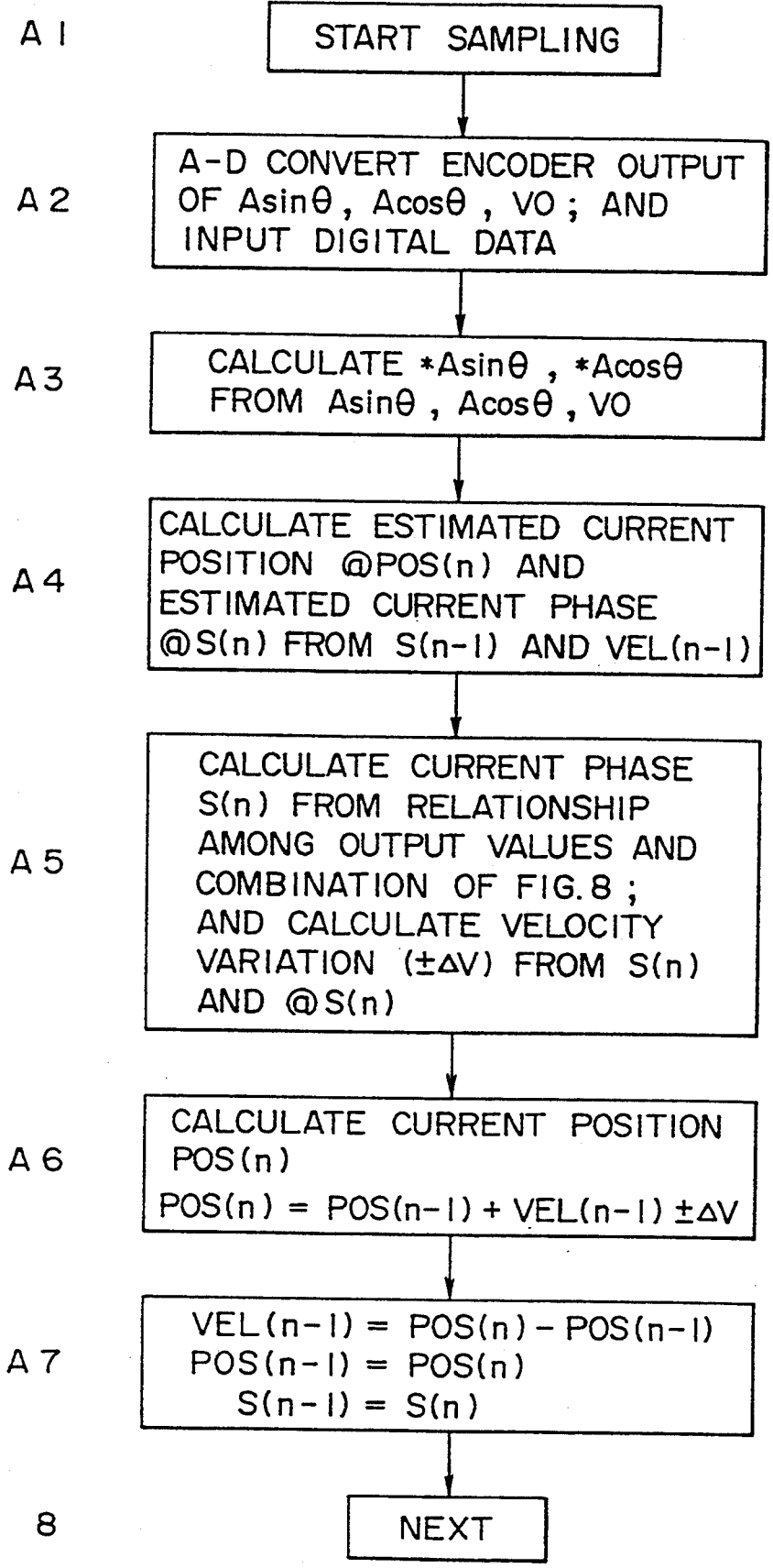
FIG. 9 is a flowchart for explaining a position detecting algorithm in a first embodiment of the present invention.

In a first embodiment of the position detecting apparatus for a sampling system according to the present invention, the current position of the object is estimated from the preceding position and the velocity on the basis of the above relationship in the uniform velocity motion of the object, and a position detection is executed on an assumption that the current position is within a distance of λ/2 from the estimated position. FIG. 9 is a flowchart of a position detecting procedure carried out by the hardware constitution shown in FIG. 1.

Similarly to the aforementioned conventional example, first the output of the sensor is sampled and, after analog-to-digital conversion, the digital data is inputted to the CPU 6 where *Asinθ and *Acosθ are calculated from Asinθ and Acosθ respectively (step A①-A③).

Subsequently the estimated value @POS(n) of the current position and the current phase @S(n) corresponding thereto are calculated from the preceding position POS(n−1), the preceding velocity VEL(n−1) and the preceding phase S(n−1) (step A④). Namely, the estimated value of the current position can be obtained from the sum of the preceding position and the preceding velocity.

$$@POS(n) = POS(n-1) + VEL(n-1) \qquad (6)$$

The estimated value of the current phase corresponding to the estimated value of the current position is obtained from the preceding phase and the preceding velocity as expressed by the following equation.

$$@S(n) = rem[\{S(n-1) + \#VEL(n-1)\}/8]$$

where #VEL(n−1) denotes the phase-converted velocity per sampling (phase/sampling), and rem [ ] denotes a function for obtaining the remainder of the division enclosed with the parenthesis [ ]. In an example where S(n−1)=3 and #VEL(n−1)=9 phases/sampling, the quotient is 1 and the remainder is 4 in the result of the division, so that the remainder obtained by such function is 4.

Thereafter the current phase S(n) is calculated on the basis of the relationship among the values of Asinθ, Acosθ, *Asinθ, *Acosθ and the combinations in the table of FIG. 7. Then S(n−1) in the table of FIG. 8 is replaced with @S(n), and there is calculated the variation ±ΔV which is the difference between the estimated value of the current phase and the value of the actual phase (step A⑤).

The variation ±ΔV represents the velocity change, i.e., the acceleration during one sampling action. If the velocity change during the sampling action is smaller than λ/2, the current position POS(n) is the sum of the estimated position @POS(n) and the variation ±ΔV, and it can be expressed as follows with reference to Eq. (6).

$$POS(n) = POS(n-1) + VEL(n-1) \pm \Delta V \qquad (7)$$

Then the current position is calculated according to Eq. (7) (step A⑥).

Finally the current velocity VEL(n) is calculated according to Eq. (5) and is determined to be VEL(n−1). Simultaneously it is delayed for a time corresponding to one sampling action as POS(n−1)=POS(n) and S(n−1)=S(n), and thereafter the process proceeds to the next step (step A⑦).

In the first embodiment mentioned above, the current position is estimated from the preceding velocity and the preceding position, and detection of the position is executed on an assumption that the current position is within a distance of λ/2 from the estimated position. Consequently, there can be solved the problem in the conventional position detection of the prior art with regard to the restriction on the motion distance during the sampling action, i.e., the restriction on the maximum velocity, hence achieving remarkable enhancement in the performances. In this case, however, there still exists a limit that the maximum velocity change or acceleration during one sampling action needs to be less than λ/2.

In an exemplary linear encoder where the sampling period T is 1 mS and the distance λ is 400 μm, there is a restriction in the conventional position detection that its maximum velocity is limited to (λ/2)/1 mS=200 μm/1 mS=0.2 m/S. In this embodiment, however, there is no restriction on the maximum velocity, and the velocity change or acceleration is limited to (λ/2)/(1 mS)$^2$−200 m/S$^2$ (approx. 20 G where G denotes the acceleration of gravity). In the prior art, when an acceleration of 10 G or so is applied to the object to be measured, an overspeed state is induced after a lapse of 2 mS. In the present invention, however, a normal position detecting operation can be performed unless any acceleration exceeding 20 G is applied.

In the first embodiment mentioned above, a great improvement can be realized in the position detecting capability of the apparatus, but there still remains a restriction on the acceleration of the moving object to be measured. In view of such circumstances, a second embodiment of the invention is so contrived that, for estimating the current position and phase, a second-degree or higher-degree term (acceleration) of the difference relative to the preceding position is adopted in addition to the preceding position and velocity, thereby eliminating the known restriction on the acceleration to eventually achieve a further enhancement of the capability.

Suppose now that the object to be measured is in uniform velocity motion. The position of the object in such uniform velocity motion is expressed in Eq. (8) by a sampling system and the acceleration ACC can be expressed by the velocity difference in Eq. (9).

$$POS(n) = POS(n-1) + VEL(n-1) + ACC(n-1) \qquad (8)$$

$$ACC(n) = VEL(n) - VEL(n-1) \qquad (9)$$

where ACC(n−1) and ACC(n) denote the preceding acceleration and the current acceleration, respectively.

Thus, the position of the object in uniform acceleration motion can be represented by the sum of the preceding position, the preceding velocity and the preceding acceleration.

Figure 10:
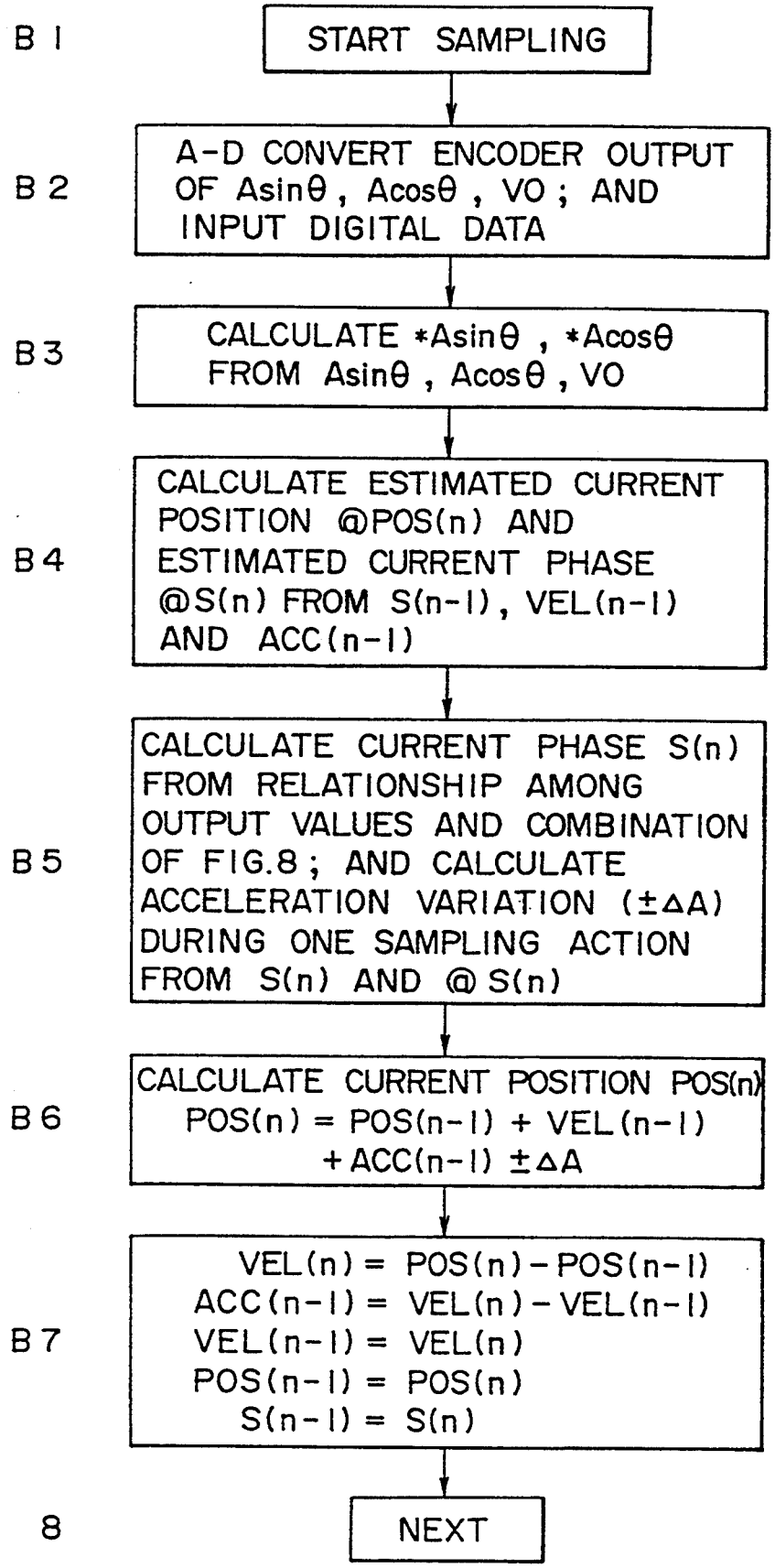
FIG. 10 is a flowchart for explaining a position detecting algorithm in a second embodiment of the invention.
Figure 13:
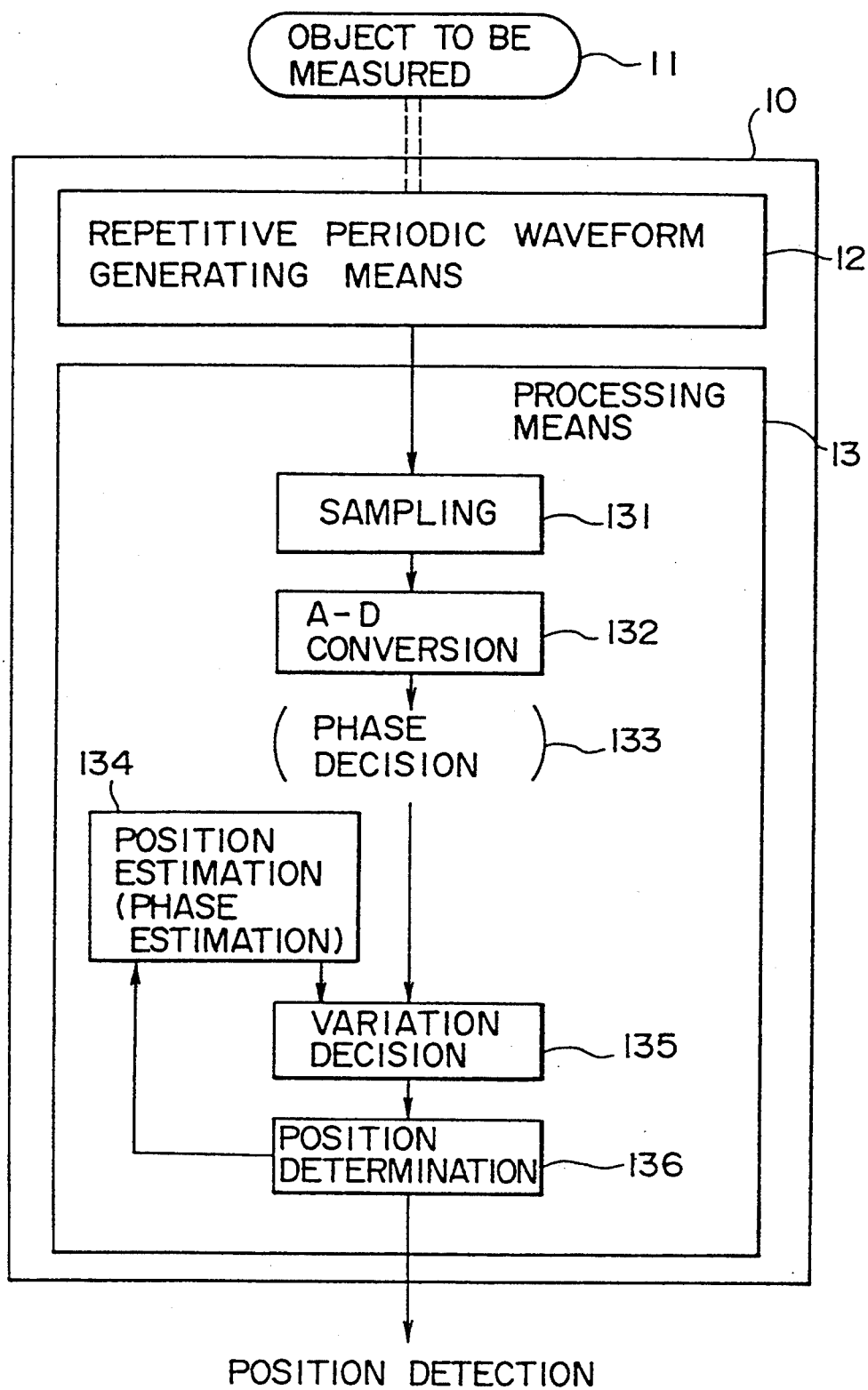
FIG. 13 is a block diagram showing a conceptional constitution of the position detecting apparatus for a sampling system according to the present invention.

In the second embodiment of the position detecting apparatus according to the present invention, the position and the phase are estimated on the basis of the relationship in the uniform acceleration motion of the object to be measured, by using the second-degree difference term of the acceleration in addition to the velocity term relative to the first-degree difference term of the position used in the aforementioned first embodiment. FIG. 10 is a flowchart of a position detecting procedure carried out for realizing such estimation by the hardware constitution shown in FIG. 1.

First the output waveform of the sensor is sampled and, after analog-to-digital conversion, the digital data thus obtained is inputted to the CPU 6 where $*A\sin\theta$ and $*A\cos\theta$ are calculated from $A\sin\theta$ and $A\cos\theta$ respectively (steps B①–B③).

Subsequently the estimated value @S(n) of the current phase is calculated from the preceding phase S(n−1), the preceding velocity VEL(n−1) and the preceding acceleration ACC(n−1) according to the following equation (step B④).

$$@S(n) = rem[\{S(n-1) + \#VEL(n-1) + \#ACC(n-1)\}/8]$$

where #ACC(n−1) denotes the second-degree difference term of the phase-converted preceding position per sampling, and rem [ ] denotes a function for obtaining the remainder of the division enclosed with the parentheses [ ]. In an example where S(n−1)=2, #VEL(n−1)=7 and #ACC(n−1)=2, the quotient is 1 and the remainder is 3 in the result of the division, so that the remainder obtained by such function is 3.

Thereafter, similarly to the procedure in the aforementioned first embodiment, S(n−1) in the table of FIG. 8 is replaced with @S(n), and a calculation is executed to obtain the difference between the estimated phase and the current phase, i.e., the variation $\pm\Delta A$ of the acceleration during the sampling action (step B⑤).

If the variation $\pm\Delta A$ is smaller than $\lambda/2$, the current position POS(n) is the sum of the preceding position POS(n−1), the preceding velocity VEL(n−1), the preceding acceleration ACC(n−1) and the variation $\pm\Delta A$ of the acceleration during the sampling action as expressed by Eq. (10), and therefore the current position can be calculated as follows (step B⑥).

$$POS(n) = POS(n-1) + VEL(n-1) + ACC(n-1) \pm \Delta A \quad (10)$$

Finally the current velocity and acceleration are calculated, and each of the position, velocity and acceleration is delayed for a time corresponding to one sampling action. And then the process proceeds to the next step (step B⑦).

According to the second embodiment of the present invention so constituted as described above, the restriction on the maximum acceleration observed in the aforementioned first embodiment is eliminated to consequently ensure an enhanced capability in detection of the position. In an exemplary case of employing the linear encoder (T=1 mS, $\lambda$=400 μm) used in the first embodiment, there exists no restriction on the maximum velocity, and the maximum acceleration is not limited either to eventually enhance the performance.

In addition to the example where the second-degree positional difference term is adopted for estimation of the current position and phase, it is also possible to adopt a higher-degree positional difference term to further enhance the performance, although the effect derived therefrom is gradually diminished in principle.

When the position detecting apparatus of the present invention is used for position detection in a high-precision positioning mechanism actuated by a direct drive motor employed generally of late, it becomes possible to realize great improvements in the performance with reduction of the production cost while increasing the resistance against any external shock or the like.

In a system for driving an optical unit in a video camera equipped with a zoom lens mechanism, a focus lens is driven by a voice-coil type linear motor to execute high-precision positioning. And when the apparatus of the present invention is employed for detection of the position in such a system, its performance can be widely enhanced to attain remarkably effective improvements in the resistance against any external shock with further advantages including reduction of the production cost and down-sizing of the system.

Besides the above embodiments where an optical linear encoder is used as a sensor, it is also possible to employ an MR sensor which comprises a linearly magnetized magnet and magnetoresistance elements disposed opposite thereto.

FIG. 11 is a schematic diagram for explaining the principle of operation of an MR sensor. For example, the MR sensor comprises a magnet 2-5 magnetized periodically at an interval $\lambda$ of several 100 μm and an MR pattern 2-6 which consists of magnetoresistance element patterns x, y arrayed at an interval of $\lambda/2$ and disposed opposite to the magnet 2-5. The magnetoresistance element patterns x, y are connected in series to a DC power source Vcc-GND. When the magnet 2-5 is displaced in accordance with the motion of an object to be measured, a repetitive periodic waveform changing sinusoidally with an amplitude of Vcc/2 from a center point A0 is generated in conformity with such displacement.

Therefore, in an arrangement where two of such MR resistance patterns 2-6 are disposed with a positional deviation of $\lambda/4$, it follows that sine waves and cosine waves are generated in accordance with the motion of the object to be measured, and such waves may be processed in the same manner as the output of the aforementioned optical encoder. Thus, such MR sensor can be employed in place of the optical encoder in the above embodiment.

FIG. 12 shows a schematic structure of an example where the present invention using an MR sensor is applied to an optical-unit driving system for a video camera equipped with a zoom lens mechanism. In this example, a focus lens is driven by a voice-coil type linear motor which comprises an actuator with a voice coil, a yoke and a magnet as shown. Another magnet for an MR sensor is incorporated in the actuator, and the MR sensor is attached to the inner wall of the system body opposite to such magnet. Therefore, when the focus lens is driven by the linear motor, repetitive periodic waves $\sin\theta$ and $\cos\theta$ are outputted from the MR sensor due to the principle mentioned. Accordingly, it is possible to position the focus lens with high precision by processing such repetitive periodic waves $\sin\theta$ and $\cos\theta$ in the apparatus of the present invention.

What is claimed is:

1. A position detecting apparatus comprising:

periodic waveform generating means for generating repetitive periodic waveforms in relation to a moving object having a position to be measured; and processing means for sampling an output of said waveform generating means and, after digitizing the output to produce the digital data, processing the digital data to detect the position of said object;

wherein said processing means first estimates a current position from digital data obtained in a preceding detection and then determines the current position on the basis of the estimated position.

2. The position detecting apparatus according to claim 1, wherein said processing means determines on the basis of the estimated position and the output from the generating means, a variation relative to a state of motion of said object during one sampling action, and determines the current position on the basis of said variation and the estimated position.

3. The position detecting apparatus according to claim 2, wherein said waveform generating means generates a plurality of repetitive periodic waveforms of the same period; and said processing means first produces phase data by classifying said digital data into one of a plurality of phase ranges defined by the plurality of repetitive periodic waveforms, and uses the estimated phase data as the estimated position.

4. The position detecting apparatus according to claim 1, wherein said processing means estimates the current position from a sum of the position from the preceding detection and a first-degree difference of the position from the preceding detection.

5. The position detecting apparatus according to claim 1, wherein said processing means determines the current position from a sum of the preceding position data, the first-degree difference of the preceding position data, and a higher-degree difference of the preceding position data.

6. The position detecting apparatus according to claim 5, wherein said higher-degree difference comprises a second degree difference.

7. The position detecting apparatus according to claim 1, wherein said waveform generating means generates a plurality of repetitive periodic waveforms of the same period; and said processing means first produces phase data by classifying said digital data into one of a plurality of phase ranges defined by the plurality of repetitive periodic waveforms, and uses the estimated phase data as the estimated position.

8. The position detecting apparatus according to claim 1, wherein the object to be measured is actuated by a direct drive motor.

9. The position detecting apparatus according to claim 1, wherein said object comprises a movable focus lens member.

10. The position detecting apparatus according to claim 1, wherein said periodic waveform generating means comprises an optical linear encoder.

11. The position detecting apparatus according to claim 1, wherein said periodic waveform generating means comprises an MR sensor.

12. A position detecting apparatus comprising:
waveform generating means for generating repetitive periodic waveforms in relation to a moving object having a position to be measured; and processing means for sampling an output of said waveform generating means and, after digitizing the output to produce digital data, processing the digital data to detect the position of said object;

wherein said processing means first produces estimated position data by estimating a current position from a sum of preceding position data and a first-degree difference of the preceding position data, then determines, on the basis of the estimated position data and the digital data from the output, a variation relative to a state of motion of said object during one sampling action, and determines the current position on the basis of said variation and the estimated position data.

13. The position detecting apparatus according to claim 12, wherein the object to be measured is actuated by a direct drive motor.

14. The position detecting apparatus according to claim 12, wherein said object comprises a movable focus lens member.

15. A position detecting apparatus comprising:
waveform generating means for generating repetitive periodic waveforms in relation to a moving object having a position to be measured; and processing means for sampling an output of said waveform generating means and, after digitizing the output to produce digital data, processing the digital data to detect the position of said object;

wherein said processing means first-produces estimated position data by estimating a current position from a sum of preceding position data, a first-degree difference of the preceding position and a higher-degree difference of the preceding position data, then determines, on the basis of the estimated data and the digital data from the output, a variation relative to a state of motion of said object during one sampling action, and determines the current position on the basis of said variation and the estimated position data.

16. The position detecting apparatus according to claim 15, wherein the object to be measured is actuated by a direct drive motor.

17. The position detecting apparatus according to claim 15, wherein said higher-degree difference comprises a second degree difference.

18. The position detecting apparatus according to claim 15, wherein said object comprises a movable focus lens member.

19. A position detecting apparatus incorporated in a system for driving an optical unit in a video camera, said apparatus comprising:
waveform generating means for generating repetitive periodic waveforms in relation to a moving focus lens member; and processing means for sampling an output of said waveform generating means, then digitizing the output to produce digital data, subsequently estimating a current position of said focus lens member from data obtain in a preceding detection, and processing the digital data from the output to determine the current position on the basis of the estimated position, thereby determining the position of said focus lens member.

* * * * *